United States Patent Office 2,795,483
Patented June 11, 1957

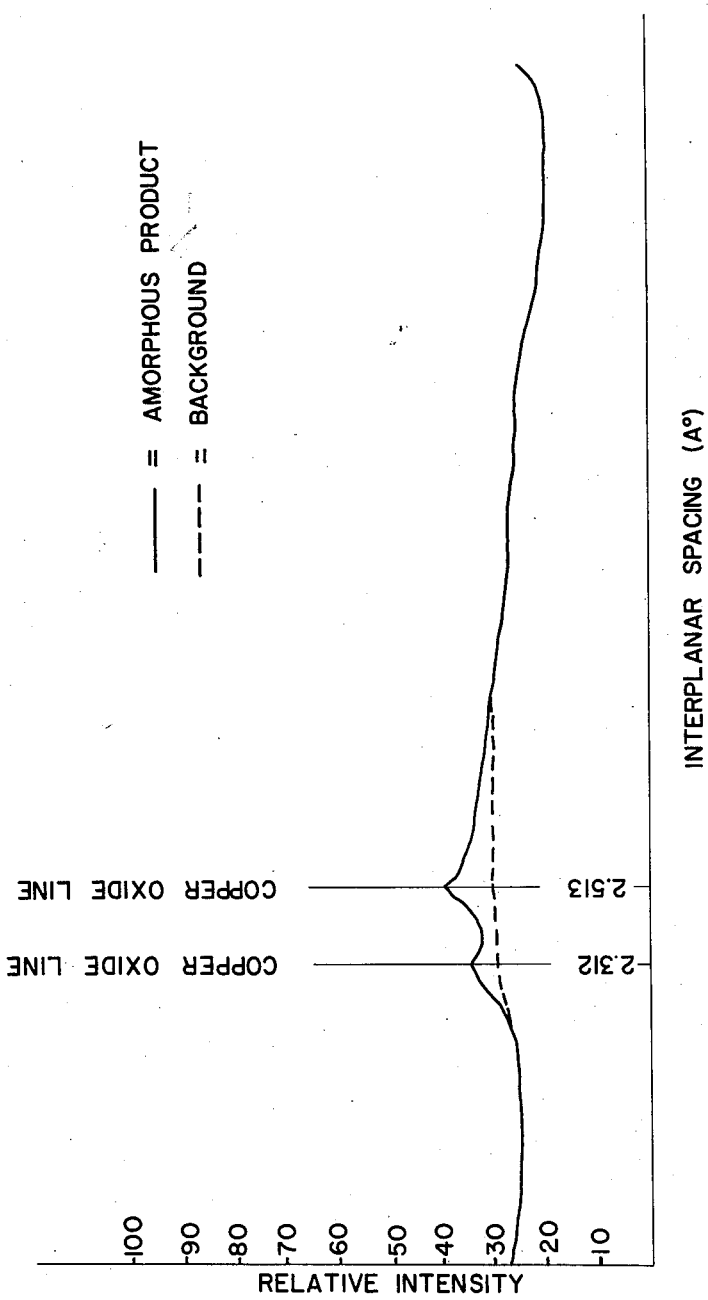

2,795,483

PIGMENT COMPOSITION AND METHODS FOR PRODUCING SAME

Roy R. Denslow, Nutley, N. J., assignor to E. I. du Pont de Nemours and Company, Wilmington, Del., a corporation of Delaware Application March 24, 1953, Serial No. 344,339

2 Claims. (Cl. 23—105)

This invention relates to novel pigment compositions and to methods for producing the same. More particularly, it relates to a new, relatively transparent, gray, substantially non-crystalline pigment comprising a copper compound adapted to provide attractive, durable coating compositions, especially of the so-called "metallic" type and including both grays and colors.

Conventionally, coating finishes are pigmented with various inorganic or organic black, white, or colored products of relatively high hiding power to provide a film of desired decorative properties, adequate durability, especially when exposed to air, moisture and sunlight, as well as to provide satisfactory covering of the substratum. During recent years, there has been a trend toward the use, particularly in automotive finishes, of so-called "metallic" enamels comprising blends of powdered aluminum with other pigments dispersed in suitable vehicles. These finishes change in depth of color when viewed from different angles and are frequently described as possessing "two-tone" appearance. For maximum beauty, a high degree of transparency in the unmetallized enamel or finish is required so that when the aluminum is added it may show through and give the desired "flash" characteristic of this type finish. For example, attractive products can be prepared from organic dyes and aluminum, but these are of little practical use because their durability and color retention characteristics on outdoor exposure are too poor.

The production of more durable metallic finishes has thus been limited by the availability of sufficiently permanent pigments in the desired color range which at the same time possess sufficient transparency to give the desired flash and two-tone with aluminum. Significant advances in the art of preparing such finishes or enamels have been made from the development of highly transparent iron oxide brown and "blacks," such as, for example, those disclosed in U. S. Patents 2,335,760, 2,384,-579 and 2,466,770. The formulation of metallic grays has, however, presented unusual difficulties. Products based on lamp black, bone black or conventional (opaque) iron oxide black plus aluminum (with or without white or shading colors) are frequently lacking in desired two-tone flash and tend to change color on exposure, largely as a result of chalking and loss of gloss. Gloss loss is particularly serious because polishing proves ineffective for bringing the surface back to its original condition.

A primary object of this invention is to overcome the above and other disadvantages which characterize prior attempts at obtaining satisfactory pigment products for use in metallic type finishes, and to provide a novel form of pigment having a neutral hue and relatively high transparency with which it is possible to readily formulate attractive gray metallic finishes with excellent color and gloss retention adapted to be readily repolished after exposure or weathering. A further object is to provide a pigment which can be blended with durable colored pigments and aluminum to produce unusual and beautiful color effects, which, like the gray metallics, also possess outstanding two-tone flash. Other objects and advantages of the invention will be evident from the ensuing description thereof and from the accompanying drawing which depicts a characteristic X-ray diffraction pattern of one preferred form of pigment of this invention.

These and other objects are achieved in this invention which comprises the provision of a novel gray pigment composition substantially non-crystalline in character and containing between about 63% and 71% of copper, expressed as "CuO," between about 15% and 20% of phosphorus, expressed as "$P_2O_5$," and combined or adsorbed water.

In a more specific and preferred embodiment, the invention comprises a pigment composition made up of a substantially non-crystalline, transparent, durable gray pigment containing between 63% and 71% of copper, expressed as "CuO," and between 15% and 20% of phosphorus, expressed as "$P_2O_5$," together with about 12% to 16% of water of hydration, said composition having an X-ray diffraction pattern in which the maximum intensity corresponding to interplanar spacings of between 1.8A. and 17.6A. is no more than 2 times the background intensity.

The amorphous gray pigment of this invention can be prepared by reacting in suitable proportions an alkaline solution of a soluble phosphate, such as disodium phosphate, with a solution of a divalent copper salt such as copper sulfate, and under such conditions as to obtain a pigment having the composition and absence of crystalline character herein contemplated.

Cupric hydroxide, either as such or associaed with more or less basic sulfate, results from the reaction, at ordinary temperatures, of solutions of caustic alkali and cupric salts. Upon heating the aqueous suspension at a sufficiently high pH, decomposition takes place with the formation of black cupric oxide. This latter material is extremely insoluble, is a definite chemical compound, and gives a characteristic X-ray pattern.

The product from the reaction between a cupric salt and a soluble orthophosphate comprises a greenish colored basic salt, having the empirical composition $CuO/P_2O_5/H_2O = 4/1/X$. Like cupric oxide, it is a definite crystalline compound and gives a characteristic X-ray pattern and which occurs in nature as the mineral Libethenite. When these compounds are dispersed in coating composition vehicles, they provide films which either lack desired transparency or are lacking in adequate gloss or color retention.

The tendency of cupric salts to hydrolyze is well known and treatment with sufficient caustic alkali will transpose them more or less completely into black cupric oxide. Thus, starting with greenish products showing the characteristic X-ray pattern of the mineral Libethenite and heating them with a sufficient excess of sodium hydroxide, a black product results which shows only the X-ray lines characteristic of cupric oxide.

From the above chemical considerations, one would expect the reaction between a cupric salt, caustic alkali and a soluble phosphate to produce a mixture of basic cupric phosphate and cupric oxide, in a ratio depending on the relative amounts of the reactants used, with each of the two compounds showing its characteristic X-ray lines. Surprisingly enough, I have found that the series of products prepared, preferably, by a coprecipitation procedure, through systematic variance of the $CuO:P_2O_5$ mole ratio in a limited range, shows neither the strong X-ray lines of basic copper phosphate nor those of cupric oxide. This is the substantially amorphous material of this invention. My further discovery is that this product is of special pigmenting value because of its neutral gray color and high transparency, in contrast to the highly different and unsatisfactory pigment properties of the compounds on either side of my critical composition. This critical range for the dark gray and amorphous products of my invention lies between the approximate mole ratios $CuO/P_2O_5=6$ and $CuO/P_2O_5=8$. These ratios correspond to a copper content in the product of from 63% to 71% (as CuO) and a phosphate content of from 15% to 20% (as $P_2O_5$) and such products are obtained by reacting at an elevated temperature the requisite amounts of soluble divalent copper salt with a mixture of alkali hydroxide and soluble ortho phosphate. Preferably, the copper salt, such as cupric sulfate, and the phosphate, such as disodium phosphate, are present in the ratio of about 1 mole to 0.5 mole, respectively, and sufficient (about 1.5 moles) alkali hydroxide is also present to give a pH of 9.5–10.5 and yield the desired product. The reaction is carried out preferably at about 82° C. after which the mixture is heated to the boil to complete the reaction. Thereafter, the reaction product can be conventionally filtered, washed, dried and pulverized to obtain the final dry pigment. Alternatively, should production of an aqueous paste containing, say, about 25–40% solids content be desired, this can be obtained by omitting said drying and pulverizing steps.

The pigment thus obtained can then be incorporated in desired quantity and through desired compounding, grinding or mixing in a conventional ball or other type mill in a suitable automotive or other type finish formulation, including paints and enamels, and until desired dispersion of the pigment in the vehicle is complete. Thus, it can be milled or otherwise mixed, in the presence or absence of suitable modifying agents, with an automotive finish such as an alkyd resin enamel, modified alkyd resin enamel, phenol formaldehyde resin enamel, resin-modified phenol formaldehyde resin enamel, other synthetic resin enamels or nitrocellulose or other cellulosic derivative enamels to obtain unique coatings having requisite film durability and other desired characteristics which the use of my pigment affords. In obtaining gray metallic finishes, aluminum or other metallic powders can also be incorporated in the enamel or finish.

To a clearer understanding of the invention, the following examples are given. These merely illustrate the invention in more detail and are not to be construed as limiting its underlying principles:

Example I 50 lbs. copper sulfate ($CuSO_4 5H_2O$) is dissolved in about 30 gallons of water at 130° F. and the resulting solution made up to 100 gallons at 180° F. To this is added, over a period of 20 minutes, a solution of 12 lbs. sodium hydroxide (NaOH) and 36 lbs. disodium phosphate ($Na_2HPO_4 12H_2O$) dissolved together in about 50 gallons at 180° F. The resulting slurry which should have a pH of 9.5–10.5 (normally about 10) is heated to a boil in 15 minutes, boiled for 5 minutes and then stirred for 15 minutes without further heating. Water is added to a volume of 200 gals. and the slurry filtered and washed substantially sulfate free. The cake is dried at 180° F. and pulverized.

A substantially non-crystalline gray pigment is obtained, containing between 63% and 71% copper, expressed as CuO and between 15% and 20% phosphorus expressed as $P_2O_5$. When dispersed with flake aluminum in a suitable vehicle, an attractive metallic gray baking enamel of excellent color and gloss retention can be obtained which upon exposure exhibits excellent resistance to color change and loss of gloss. In such enamel preparation, a mixture of 23 parts of weight of the pigment of this example
96 parts by weight of alkyd resin—50% solids
19 parts by weight of naphtha
19 parts by weight of xylol is ground for 96 hours in a ball mill.

After such grinding there is added:

77 parts by weight of alkyd resin—50% solids
16 parts by weight of melamine resin—60% solids
9 parts by weight of naphtha
9 parts by weight of xylol
0.3 parts by weight of drier and the resulting mixture is ground for 30 minutes and strained.

To 120 parts of the masstone enamel thus obtained, 29.6 parts of the following aluminum paint formulation is added and thorough admixture therebetween is effected:

193 parts by weight of alkyd resin—50% solids
18 parts by weight of melamine resin—60% solids
21 parts by weight of naphtha
31 parts by weight of xylol
29 parts by weight of aluminum paste (non-leafing type—60% metal)
0.4 part by weight of drier

Example II 34 lbs. cupric chloride ($CuCl_2 H_2O$) is dissolved in about 30 gallons of water at 130° F. and the resulting solution made up to 100 gallons at 180° F. To this is added, over a period of 20 minutes, a solution of 12 lbs. sodium hydroxide (NaOH) and 36 lbs. disodium phosphate ($Na_2HPO_4 12H_2O$) dissolved together in about 50 gallons at 180° F. The resulting slurry which should have a pH of 9.5–10.5 (normally about 10) is heated to a boil in 15 minutes, boiled for 5 minutes and then stirred for 15 minutes without further heating. Water is added to a volume of 200 gals. and the slurry filtered and washed substantially sulfate free. The cake is dried at 180° F. and pulverized.

A substantially non-crystalline gray pigment is obtained, containing between 63% and 71% copper, expressed as CuO and between 15% and 20% phosphorus expressed as $P_2O_5$. When dispersed in a suitable vehicle such as mentioned in Example I, a transparent enamel is obtained. To obtain a "metallic" gray baking enamel or finish having excellent color and gloss retention, flake aluminum is dispersed in the vehicle. This enamel exhibits excellent resistance to color change and loss of gloss on exposure to weathering.

Example III 59 lbs. cupric nitrate ($Cu(NO_3)_2 6H_2O$) is dissolved in about 30 gallons of water at 130° F. and the resulting solution made up to 100 gallons at 180° F. To this is added, over a period of 20 minutes, a solution of 12 lbs. sodium hydroxide (NaOH) and 36 lbs. disodium phosphate ($Na_2HPO_4 12H_2O$) dissolved together in about 50 gallons at 180° F. The resulting slurry which should have a pH of 9.5–10.5 (normally about 10) is heated to a boil in 15 minutes, boiled for 5 minutes and then stirred for 15 minutes without further heating. Water is added to a volume of 200 gals. and the slurry filtered and washed substantially sulfate free. The cake is dried at 180° F. and pulverized.

A substantially non-crystalline gray pigment results from the above, containing between 63% and 71% copper, expressed as CuO and between 15% and 20% phosphorus expressed as $P_2O_5$. Upon being dispersed with flake aluminum in the enamel vehicle described in Example I, a metallic gray baking enamel exhibiting excellent color and gloss retention is obtained. The coating on exposure to determine durability exhibits excellent resistance to color change and loss of gloss.

Example IV 50 lbs. copper sulfate ($CuSO_4 5H_2O$) is dissolved in about 30 gallons of water at 130° F. and the resulting solution made up to 100 gallons at 180° F. To this is added, over a period of 20 minutes, a solution of 8 lbs. sodium hydroxide (NaOH) and 38 lbs. trisodium phosphate ($Na_3PO_4 12H_2O$) dissolved together in about 50 gallons at 180° F. The resulting slurry which should have a pH of 9.5-10.5 (normally about 10) is heated to a boil in 15 minutes, boiled for 5 minutes and then stirred for 15 minutes without further heating. Water is added to a volume of 200 gals. and the slurry filtered and washed substantially sulfate free. The cake is dried at 180° F. and pulverized.

The non-crystalline gray pigment obtained contains between 63% and 71% copper, expressed as CuO and between 15% and 20% phosphorus expressed as $P_2O_5$. When dispersed with flake aluminum in the vehicle described in Example I, it provides an attractive metallic gray baking enamel of excellent color and gloss retention, which, when exposed to weathering, exhibits excellent resistance to color change and loss of gloss.

While illustrated above as applied to certain specific embodiments, the invention is obviously not restricted thereto. Thus, while specific copper salts are mentioned, use is generally contemplated of all soluble divalent salts of that metal including the chlorides, nitrates, sulfates, acetates, etc., thereof. Similarly, while disodium orthophosphate is preferred for use, trisodium orthophosphate or any other soluble orthophosphate, including especially sodium and potassium orthophosphates, can be used. Likewise, while NaOH is a preferred useful hydroxide, potassium and other soluble alkali hydroxides can be employed.

Again, enamels similar to that prepared in accordance with Example I can be made using many different vehicles within the ordinary skill of the paint formulator, as can other forms of coating compositions. For instance, instead of the melamine-alkyd resin combination mentioned, alkyd resins alone can be used. Likewise, nitrocellulose lacquer vehicles can be employed, as well as combinations of these and other resins which may be desired for any specific use. Similarly, the enamel composition can be suitably varied, as can also the procedures for making it. Thus, for example, attractive finishes can be made by conventionally "flushing" the pigment from an aqueous paste into the vehicle.

Furthermore, automotive and other finishes of highly interesting and desirable decorative effects can be formulated by using my novel gray pigment composition in combination with well-known inorganic or organic colored pigments of comparable lightfastness and durability in the presence of flake aluminum and in any desired proportions. For instance, mixtures of the gray pigment with copper phthalocyanine blue or green and flake aluminum enable the preparation of blue or green enamels or lacquers of highly desirable color characteristics, particularly for automotive finishes. Similarly, other colored pigments of the desired lightfastness and durability can be used, examples thereof including chromium oxide and chromium hydrate greens, various vat dye pigments, copper ferrocyanide maroon, and the like.

The most convenient method for altering the $CuO/P_2O_5$ ratio is to vary the amount of caustic alkali added to the phosphate solution in excess of that necessary to form the 4/1 basic phosphate. As the excess is increased, the products become darker with the basic phosphate X-ray diffraction pattern less clearly defined. After the critical region of non-crystallinity herein contemplated is passed, still darker products will be obtained, showing that free, crystalline cupric oxide is present.

Qualitative confirmation of the amorphous nature of my new product can be determined by electron micrographs taken at a magnification of 35,000 diameters. It will be found that the particles average less than 0.1 micron in size and show no indication of crystallinity, thereby differing from either basic copper phosphate or cupric oxide prepared separately. Thus, when a simple mixture of cupric oxide and basic phosphate is prepared, for example, by slurrying suitable amounts of these two compounds together, such mixture will show both sets of X-ray lines, and will be similar in color and opacity to cupric oxide and quite unlike the novel gray pigment of this invention.

The X-ray diffraction patterns referred to herein were determined in accordance with well-known methods of obtaining X-ray diffraction patterns of powdered solids. One method now widely used involves the scanning of the diffracted rays with a Geiger counter whereby a curve is drawn recording the intensity of the diffracted beam as a function of the angle of departure from the incident beam. The X-ray diffraction pattern diagrammed in the accompanying drawing was obtained in this manner.

It will be noted that there is no point on the curve where there is a complete absence of any indication of X-rays. It is characteristic of X-ray diffraction patterns that there is always some random scattering of X-rays which is a function both of the substance under exposure and the angle of incidence. This is known as the "background intensity" and must always be considered in measuring the intensity of any given diffraction peak.

X-ray diffraction patterns are used herein to show the difference between crystalline copper oxide and basic copper phosphate on the one hand and the non-crystalline or amorphous gray pigment of this invention. These terms are merely descriptive of the degree of order exhibited in the arrangement of the atoms within the solid structure.

In the X-ray patterns of copper oxide, basic copper phosphate, Libethenite, and the gray pigment of this invention, the background intensity can be sketched in as a dotted line. As shown by the accompanying drawing, the maximum intensity observed for my product falls well within the ratio of 2 times the background intensity. The relatively flat curve of my non-crystalline gray pigment will be found to be in marked contrast to the sharp but distinctly different peaks which the two crystalline materials will exhibit or the pattern manifested by a physical mixture of copper oxide and basic copper phosphate in the proportions necessary to give the same chemical analysis as my novel pigment. The non-crystalline (or amorphous) materials of this invention can be defined as substances in which the maximum intensity in the X-ray diffraction pattern corresponding to interplanar spacings of between 1.8 A. and 17.6 A. does not exceed about two times said background intensity. They are further characterized by an X-ray diffraction pattern in which the intensities of the major lines obtained from basic copper phosphate or the mineral Libethenite, corresponding, respectively, to interplanar spacings of approximately 2.6, 2.9, 3.7, 4.8 and 5.8 A., are less than 1.2 times the background intensity. Preferably, the product comprises one in which the X-ray diffraction pattern is further characterized in that the intensities of the major cupric oxide lines, corresponding, respectively, to interplanar spacings of approximately 2.3 and 2.5 A., are less than 1.5 times the background intensity.

I claim as my invention:

1. A method for preparing a non-crystalline, transparent, durable gray pigmenting substance which comprises reacting at about 82° C. a mixture of an alkali hydroxide and a soluble orthophosphate with a soluble divalent copper salt and employing in the reaction a ratio of 1 mole to 0.5 mole of copper salt and phosphate, respectively, and an amount of alkali hydroxide to provide a pH of 9.5-10.5 in the reaction mixture, and subsequently heating to the boil.

2. A method for preparing a new, substantially non-crystalline, transparent, durable gray pigment containing between 63% and 71% of copper, calculated as CuO, and between 15% and 20% of phosphorus, calculated as $P_2O_5$, comprising reacting at about 82° C. 1 mole of cupric sulfate with a mixture of 0.5 mole of disodium phosphate, and 1.5 moles of sodium hydroxide, heating to the boil, and thereafter filtering, washing and recovering the pigment product.

References Cited in the file of this patent

UNITED STATES PATENTS

| | | |
|---|---|---|
| 1,589,700 | Immerheiser | June 22, 1926 |
| 2,108,940 | MacIntire | Feb. 22, 1938 |
| 2,141,965 | Aronberg | Dec. 27, 1938 |
| 2,301,762 | Tuwiner et al. | Nov. 10, 1942 |
| 2,385,066 | DuRose et al. | Sept. 18, 1945 |
| 2,554,819 | Eads | May 29, 1951 |
| 2,579,610 | Pitre | Dec. 25, 1951 |

OTHER REFERENCES

Mellor: "Comprehensive Treatise on Inorganic and Theoretical Chemistry," vol. 3, pages 287–289, 1923, Longmans, Green and Co., N. Y.